(12) United States Patent
Sridhar et al.

(10) Patent No.: US 10,992,548 B2
(45) Date of Patent: Apr. 27, 2021

(54) METHOD AND SYSTEM FOR REMOTE QUALITY OF EXPERIENCE DIAGNOSTICS BASED ON A TRAFFIC SIGNATURE DETERMINED FROM ANALYZING SUBSCRIBER DATA AND TRAFFIC FLOW PERFORMANCE STATISTICS

(71) Applicant: Sandvine Corporation, Waterloo (CA)

(72) Inventors: Kamakshi Sridhar, Fremont, CA (US); Mostafa Mohamed Hassan, Waterloo (CA); Ty Sayers, Waterloo (CA); Nick St. Pierre, Waterloo (CA); Alexander Havang, Malmo (SE); John Hoover, Waterloo (CA); David Amedeo, Waterloo (CA); Matthew Lee Farmer, London (GB)

( * ) Notice: Subject to any disclaimer, the term of this patent is extended or adjusted under 35 U.S.C. 154(b) by 21 days.

(21) Appl. No.: 16/592,032

(22) Filed: Oct. 3, 2019

(65) Prior Publication Data

US 2020/0112491 A1 Apr. 9, 2020

Related U.S. Application Data

(60) Provisional application No. 62/741,950, filed on Oct. 5, 2018.

(51) Int. Cl.
*H04L 12/24* (2006.01)
(52) U.S. Cl.
CPC ...... *H04L 41/5009* (2013.01); *H04L 41/5038* (2013.01); *H04L 41/5067* (2013.01)

(58) Field of Classification Search
CPC ............. H04L 41/5009; H04L 41/5038; H04L 41/5067; H04L 43/026
See application file for complete search history.

(56) References Cited

U.S. PATENT DOCUMENTS

| | | | | | |
|---|---|---|---|---|---|
| 6,003,079 | A | * | 12/1999 | Friedrich | ............ H04L 41/5035 709/223 |
| 6,563,796 | B1 | * | 5/2003 | Saito | ................... H04L 12/5601 370/252 |
| 6,590,885 | B1 | * | 7/2003 | Jorgensen | ........... H04L 12/1827 370/338 |
| 7,765,294 | B2 | * | 7/2010 | Edwards | ................. H04L 45/28 709/224 |
| 7,872,597 | B2 | * | 1/2011 | Samuels | ............. H03M 7/3084 341/51 |

(Continued)

*Primary Examiner* — Daniel C. Murray
(74) *Attorney, Agent, or Firm* — Gowling WLG (Canada) LLP; Neil W. Henderson (57) ABSTRACT

A method and system for remote diagnostic of Quality of Experience (QoE) for a subscriber on a computer network. The method includes: reviewing a plurality of traffic flows associated with a subscriber to determine performance statistics correlated with each of the traffic flows; determining subscriber data related to the subscriber associated with the plurality of traffic flows; analyzing the subscriber data and performance statistics to determine a traffic signature associated with the plurality of traffic flows; retrieving a plurality of known traffic signatures associate with QoE issues; determining whether the traffic signature matches any of the plurality of known traffic signatures; and diagnosing the QoE issue based on the match of the traffic signatures.

20 Claims, 7 Drawing Sheets

(56) References Cited

U.S. PATENT DOCUMENTS

| | | | |
|---|---|---|---|
| 8,307,065 B2* | 11/2012 | McNaughton | H04L 41/5003 709/224 |
| 8,948,016 B2* | 2/2015 | Kruglick | H04L 41/0631 370/241 |
| 9,210,453 B1* | 12/2015 | Cloonan | H04N 21/2385 |
| 9,237,339 B1* | 1/2016 | Bordner-Babayigit | H04N 21/4781 |
| 9,253,661 B2* | 2/2016 | Bugenhagen | H04L 43/0811 |
| 9,414,248 B2* | 8/2016 | Kovvali | H04W 24/04 |
| 9,479,341 B2* | 10/2016 | Bugenhagen | H04L 45/28 |
| 9,661,514 B2* | 5/2017 | Coppage | H04W 28/18 |
| 9,712,410 B1* | 7/2017 | Char | H04L 43/08 |
| 9,806,972 B2* | 10/2017 | Edwards | H04L 12/66 |
| 9,832,090 B2* | 11/2017 | Bugenhagen | H04L 41/5035 |
| 9,973,966 B2* | 5/2018 | Karampatsis | H04W 72/1242 |
| 10,015,686 B2* | 7/2018 | Townend | H04L 43/08 |
| 10,142,860 B2* | 11/2018 | Jain | H04L 43/04 |
| 10,146,395 B2* | 12/2018 | Hui | H04L 41/5067 |
| 10,237,144 B2* | 3/2019 | Yoon | H04L 41/5009 |
| 10,285,038 B2* | 5/2019 | Hammer | H04W 8/005 |
| 10,412,550 B2* | 9/2019 | Yoon | H04W 4/029 |
| 10,454,797 B2* | 10/2019 | Balakrishnan | H04L 41/0823 |
| 10,469,385 B2* | 11/2019 | Heinz | H04L 47/822 |
| 10,601,869 B2* | 3/2020 | Joch | H04L 63/062 |
| 10,652,776 B2* | 5/2020 | Lau | H04W 24/10 |
| 2008/0005156 A1* | 1/2008 | Edwards | H04L 65/1069 |
| 2008/0049639 A1* | 2/2008 | Wiley | H04L 41/5029 370/252 |
| 2008/0137549 A1* | 6/2008 | Manthoulis | H04L 41/509 370/252 |
| 2011/0310744 A1* | 12/2011 | Besset | H04L 43/12 370/241 |
| 2013/0286861 A1* | 10/2013 | Smith | H04L 41/5009 370/252 |
| 2015/0138994 A1* | 5/2015 | Dadheech | H04L 41/5025 370/249 |
| 2015/0281004 A1* | 10/2015 | Kakadia | H04L 41/0816 370/235 |
| 2015/0326455 A1* | 11/2015 | Hui | G06F 3/04842 715/736 |
| 2016/0065419 A1* | 3/2016 | Szilagyi | G06F 11/3006 709/224 |
| 2016/0212031 A1* | 7/2016 | Jain | H04L 43/0876 |
| 2016/0248624 A1* | 8/2016 | Tapia | H04L 43/065 |
| 2016/0266954 A1* | 9/2016 | Paulraj | G06F 11/079 |
| 2016/0269913 A1* | 9/2016 | Paulraj | H04W 16/18 |
| 2016/0269920 A1* | 9/2016 | Bandemer | H04W 24/08 |
| 2016/0269922 A1* | 9/2016 | Tellado | H04W 24/04 |
| 2016/0269932 A1* | 9/2016 | Nemavat | H04L 47/25 |
| 2016/0353318 A1* | 12/2016 | Liu | H04L 41/00 |
| 2017/0012833 A1* | 1/2017 | Kumar | H04L 41/5009 |
| 2017/0019291 A1* | 1/2017 | Tapia | H04L 41/5067 |
| 2017/0237777 A1* | 8/2017 | Joch | H04L 63/062 713/152 |
| 2017/0353991 A1* | 12/2017 | Tapia | H04L 41/147 |
| 2017/0373950 A1* | 12/2017 | Szilagyi | H04L 43/00 |
| 2018/0234320 A1* | 8/2018 | Paulraj | H04W 28/0268 |
| 2018/0324057 A1* | 11/2018 | Agrawal | H04L 41/5016 |
| 2018/0324058 A1* | 11/2018 | Agrawal | H04L 41/5009 |
| 2018/0367421 A1* | 12/2018 | Cloonan | H04L 41/5006 |
| 2019/0207860 A1* | 7/2019 | York | H04L 41/065 |
| 2019/0208437 A1* | 7/2019 | Lau | H04L 41/5009 |
| 2019/0372897 A1* | 12/2019 | Fuerter | H04L 47/41 |
| 2020/0304364 A1* | 9/2020 | Tapia | H04W 24/04 |
| 2020/0322826 A1* | 10/2020 | Wangler | H04L 41/5009 |

* cited by examiner

METHOD AND SYSTEM FOR REMOTE QUALITY OF EXPERIENCE DIAGNOSTICS BASED ON A TRAFFIC SIGNATURE DETERMINED FROM ANALYZING SUBSCRIBER DATA AND TRAFFIC FLOW PERFORMANCE STATISTICS

RELATED APPLICATIONS

The present application claims priority from U.S. Provisional Patent Application No. 62/741,950 filed Oct. 5, 2018, which is hereby incorporated herein by reference.

FIELD

The present disclosure relates generally to computer network traffic and remote diagnostics. More particularly, the present disclosure relates to a system and method for remote Quality of Experience (QoE) diagnostics.

BACKGROUND

Computer networks and online traffic continues to be more common and more people are connected through various types devices. Subscriber expectations for Quality of Service (QoS) and Quality of Experience (QoE) have continued to increase all over the world. This is particularly true during a subscriber's normal daily usage at home. Device diversity, as well as the availability of richer operator content, has led to higher subscriber QoE expectations. Subscribers generally expect to have a reliable connection with low latency and high throughput, with little downtime or interruptions when engaging in their daily use. When these expectations are not met and a customer perceives a degradation in service quality, the customer often contacts the Communications Service Provider (CSP) (Cable operators, DSL operators, Satellite Operators, Fixed Wireless Access Operators and the like) or the Internet Service Provider (ISP) by calling in and making a request to have the issue fixed. The core assumption by subscribers is generally that a degradation in QoS must be attributable to the CSP's network and potential congestion or misconfiguration. By calling in and making this request, the CSP may schedule a mobile truck to travel to the subscriber's home or network site location in order to diagnose the issue and attempt to fix it.

These types of customer site visits, sometimes referred to as truck rolls, are a huge source of expense for service providers, proving to be time consuming and costly to provide. Furthermore, it has been estimated that up to 70% of all truck roles can be attributed to various internal home WiFi issues, which are difficult for the network provider to diagnose let alone fix because there is very little visibility into the network beyond Network Address Translation (NAT) devices (for example, a home modem, router, WiFi access point or the like). These truck rolls are a large source of expense that may provide no benefit, as the CSP may be unable to fix the issues that the subscriber is experiencing. The widespread availability of low-cost WiFi access points has made home WiFi networks an extremely common and prevalent method of Internet access for subscribers in Cable and DSL networks.

However, as most subscribers are not networking experts and do not possess the level of knowledge required to diagnose WiFi access issues, subscribers frequently contact the CSP and request assistance if the service level has decreased. This leads to a situation where there are calls being made to the customer care center and truck rolls are being issued in order to diagnose and fix issues such as home WiFi congestion or poor access point placement, which are not generally CSP related issues. This highlights the importance of a CSP being able to reliably and accurately diagnose subscriber access issues based on remote network diagnostics. It would be preferable for the CSP to take the appropriate actions to mitigate concerns and minimize or reduce the overall number of unnecessary truck rolls, which are both costly and provide no benefit to the end user. Therefore, there is a need for an improved system and method for remote QoS/QoE diagnostics.

The above information is presented only to assist with an understanding of the present disclosure. No determination has been made, and no assertion is made, as to whether any of the above might be applicable as prior art with regard to the present disclosure.

SUMMARY

In a first aspect, there is provided a method for remote diagnostic of Quality of Experience (QoE) for a subscriber on a computer network, the method including: reviewing a plurality of traffic flows associated with a subscriber to determine performance statistics correlated with each of the traffic flows; determining subscriber data related to the subscriber associated with the plurality of traffic flows; analyzing the subscriber data and performance statistics to determine a traffic signature associated with the plurality of traffic flows; retrieving a plurality of known traffic signatures associate with QoE issues; determining whether the traffic signature matches any of the plurality of known traffic signatures; and diagnosing the QoE issue based on the match of the traffic signatures.

In some cases, the performance statistics may include: round trip time, packet loss and throughput.

In some cases, the method may include performing traffic management actions based on the diagnosed QoE issue.

In some cases, the traffic management action may include: sending the subscriber and upgraded customer premises equipment, upselling the subscriber with WiFi extenders, dynamically rebonding the upstream or downstream channel assignments.

In some cases, the QoE issue may be selected from the group comprising: a poor WiFi access point placement, WiFi downlink congestion, WiFi uplink congestion, downlink access congestion, uplink access congestion, and cable degradation.

In some cases, the method may further include flagging the subscriber experiencing the diagnosed QoE issue; and reporting the flagged subscriber to a service provider.

In some cases, analyzing of the performance statics may include: determining a plurality of performance statistics for each of the plurality of traffic flows associated with a subscriber; determining a service group related to the subscriber; determining an average for each of the plurality of performance statistics for the service group; determining whether the each of the plurality of performance statistics for each of the plurality of traffic flows associated with a subscriber is above the average of each of the plurality of performance statistics for the service group for a predetermined threshold percentage of time; and if the average of any of the plurality of performance statistics for each of the plurality of traffic flows associated with a subscriber is above the predetermined threshold, determining the subscriber has a QoE issue; otherwise determining that the subscriber is not suffering from pa QoE issue.

In some cases, analyzing of the performance statics may include: determining a plurality of performance statistics for each of the plurality of traffic flows associated with a subscriber; determining a bonding group related to the subscriber; determining an average for each of the plurality of performance statistics for the bonding group; determining whether the each of the plurality of performance statistics for each of the plurality of traffic flows associated with a subscriber is above the average of each of the plurality of performance statistics for the bonding group for a predetermined threshold percentage of time; and if the average of any of the plurality of performance statistics for each of the plurality of traffic flows associated with a subscriber is above the predetermined threshold, determining the subscriber has a QoE issue; otherwise determining that the subscriber is not suffering from a QoE issue.

In some cases, the method may further include: storing the diagnosed QoE issue associated with a subscriber.

In some case, the method may further include: retrieving previously stored QoE issues associated with a subscriber; and aggregating the diagnosed QoE issue with the previously stored QoE issues to determine a severity of the QoE issue.

In another aspect, there is provided a system for remote diagnostic of Quality of Experience (QoE) for a subscriber on a computer network, the system including: a quality measurement module configured to review a plurality of traffic flows associated with a subscriber to determine performance statistics correlated with each of the traffic flows; a subscriber behavior module configured to determine subscriber data related to the subscriber associated with the plurality of traffic flows; a memory component configured to store known traffic signatures associated with QoE issues; an analysis module configured to analyze the subscriber data and performance statistics to determine a traffic signature associated with the plurality of traffic flows; and a diagnostic module configured to retrieve a plurality of known traffic signatures associate with QoE issues; determine whether the traffic signature matches any of the plurality of known traffic signatures; and diagnose the QoE issue based on the match of the traffic signatures.

In some cases, the performance statistics may be: round trip time, packet loss and throughput.

In some cases, the diagnostic module may be further configured to perform traffic management actions based on the diagnosed QoE issue.

In some cases, the traffic management action may be: sending the subscriber and upgraded customer premises equipment, upselling the subscriber with WiFi extenders, dynamically rebonding the upstream or downstream channel assignments.

In some cases, the QoE issue may be selected from the group including: a poor WiFi access point placement, WiFi downlink congestion, WiFi uplink congestion, downlink access congestion, uplink access congestion, and cable degradation.

In some cases, the diagnostic module may be further configured to: flag the subscriber experiencing the diagnosed QoE issue; and report the flagged subscriber to a service provider.

In some cases, the analysis module, when analyzing of the performance statics, may be configured to: determine a plurality of performance statistics for each of the plurality of traffic flows associated with a subscriber; determine a service group related to the subscriber; determine an average for each of the plurality of performance statistics for the service group; determine whether the each of the plurality of performance statistics for each of the plurality of traffic flows associated with a subscriber is above the average of each of the plurality of performance statistics for the service group for a predetermined threshold percentage of time; and if the average of any of the plurality of performance statistics for each of the plurality of traffic flows associated with a subscriber is above the predetermined threshold, determine the subscriber has a QoE issue; otherwise determine that the subscriber is not suffering from a QoE issue.

In some cases, the analysis module, when analyzing of the performance statics, may be configured to: determine a plurality of performance statistics for each of the plurality of traffic flows associated with a subscriber; determine a bonding group related to the subscriber; determine an average for each of the plurality of performance statistics for the bonding group; determine whether the each of the plurality of performance statistics for each of the plurality of traffic flows associated with a subscriber is above the average of each of the plurality of performance statistics for the bonding group for a predetermined threshold percentage of time; and if the average of any of the plurality of performance statistics for each of the plurality of traffic flows associated with a subscriber is above the predetermined threshold, determine the subscriber has a QoE issue; otherwise determine that the subscriber is not suffering from a QoE issue.

In some cases, the memory component may be further configured to store the diagnosed QoE issue associated with a subscriber.

In some cases, the diagnostic module may be configured to retrieve previously stored QoE issues associated with a subscriber and aggregate the diagnosed QoE issue with the previously stored QoE issues to determine a severity of the QoE issue. Other aspects and features of the present disclosure will become apparent to those ordinarily skilled in the art upon review of the following description of specific embodiments in conjunction with the accompanying figures.

BRIEF DESCRIPTION OF FIGURES

Embodiments of the present disclosure will now be described, by way of example only, with reference to the attached Figures.

DETAILED DESCRIPTION

Generally, the present disclosure provides a method and system for diagnosing QoE remotely. Generally, the system and method are configured to determine performance statistics associated with a traffic flow of a subscriber. The system analyzes the performance statistics and determines whether a subscriber is an issue and a diagnosis for any issues. In some cases, the system may notify or provide for an action to address the diagnosed issue.

Figure 1:
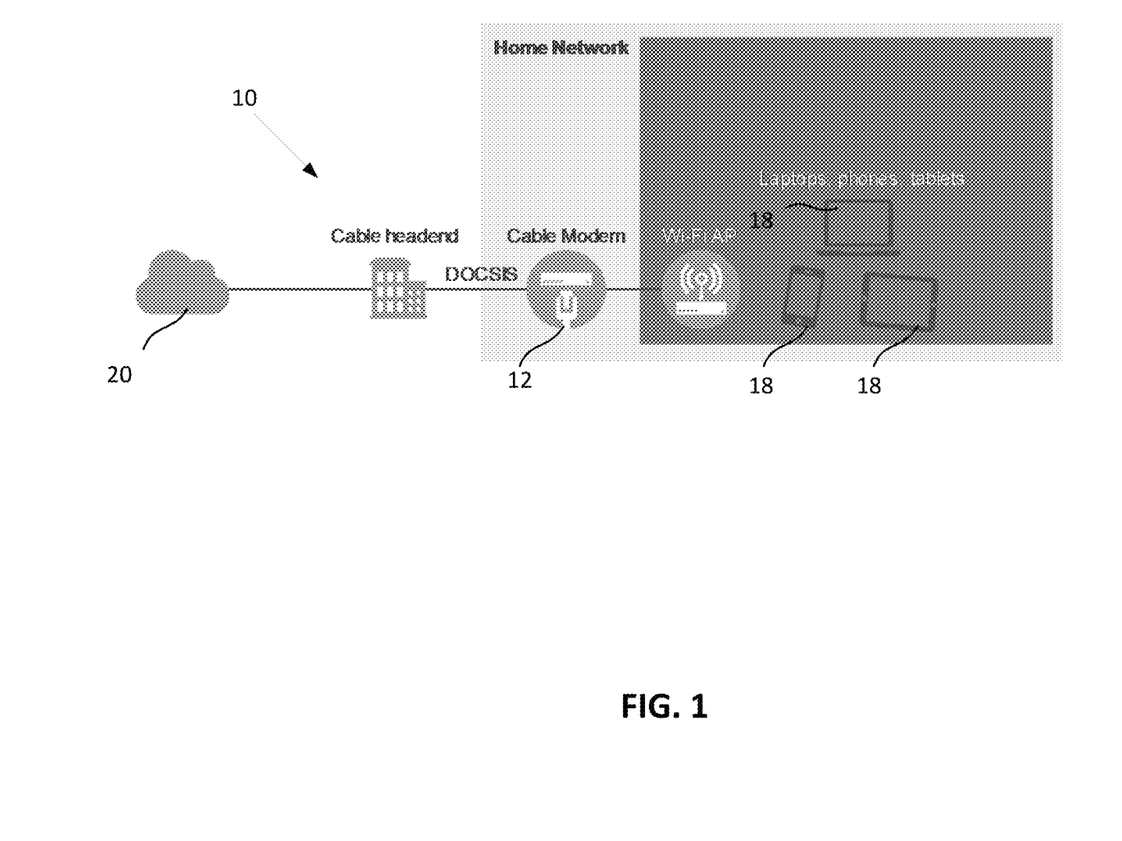
FIG. 1 illustrates a cable network architecture.

Figure shows a schematic of a Cable Network Architecture. A cable subscriber or end user have end user devices 18, which access the Internet 20 via the Cable Network 10. There is traditionally very little visibility via a network to identify subscriber QoE issues inside a home, place of business or other remote location. For example, in the Cable Network 10, a Cable Modem Termination System (CMTS) 12 connects to the cable service provider's network. There is a Hybrid Fiber Coax network between a plurality of end users 18 and the CMTS 12. Inside each subscribers home or remote location, there may be one or more routers, Wireless Access Points connected to one or more user devices or the like that serve multiple applications over multiple devices. A similar situation applies in DSL networks, Satellite networks, Fixed Wireless Access networks or the like. Each of these networks deliver broadband data through their infrastructure to a home or an enterprise that may have a WiFi access point. In these networks, a subscriber may experience poor QoE for one or more applications on the subscriber's devices due to, for example, the WiFi access point being placed poor location, WiFi congestion, access congestion, or the like. The degree of access congestion will depend on the type of access infrastructure, for example, Cable, DSL or fixed wireless access.

Embodiments of the system and method disclosed herein are intended to reduce the number of unnecessary truck rolls or customer visits executed by network providers or Communication Service Provider (CSP) and reduce the number of undiagnosed subscriber access issues, which may lead to customer support calls, which are often costly. Beyond the expense of unnecessary truck rolls, limited information is available to the customer care agent in diagnosing and resolving the subscriber problems resulting in longer resolution times and higher customer care expense. Furthermore, subscribers who experience poor Quality of Service (QOS) due to access issues without quick resolution are more likely to churn to another provider.

Embodiments of the system and method described herein are intended to remotely detect and diagnose incipient subscriber and device Quality of Experience (QoE) issues inside the remote or home network, for example, the WiFi network. The detection and diagnosis may include analysis of subscriber data and correlating with typical WiFi network behavior. Periodically, say every 100 ms, 250 ms, 500 ms, or the like, the system is configured to receive or retrieve samples of throughput to the subscriber, packet loss, and round trip time between the system and the subscriber (and back).

This information as well as other statistical information the system may retrieve from the traffic flow and subscriber information may be included in the subscriber data used by the embodiments of the system and method. Models for the underlying WiFi behaviors may be developed in the system and may be used to describe the expected variations in throughput, packet loss and round-trip time for each individual issue type. Thereby the identification of faults is based on principles of WiFi networking behavior and is expected to be fairly typical across operator networks where there are WiFi access points. The principles of Incipient Proactive Diagnostics of WiFi QoE issues described may be applicable to at least Cable Networks and DSL networks, and other networks including satellite networks, fixed wireless access networks and fiber networks. The system and method may be beneficial to networks which include access congestion or/and a WiFi component or WiFi access points. The term incipient when used herein is intended to refer to the ability to detect failures in the early stages when the impact of those failures is just beginning to show in the data trends and may not yet be evident to the subscriber. The term proactive refers to the ability to diagnose those failures quickly which is intended to allow the customer care agent to solve issues and failures in a responsive manner either before the customer calls into the service provider, or during the call with the customer care agent.

Communications Service Providers (CSPs) and/or Internet Service Providers (ISPs) typically invest a large amount of capital in fulfilling unnecessary truck roll requests to try and diagnose subscriber access issues that may not be possible to be fixed as the issues may not be related to the service provider's equipment. Network operators and service providers have good visibility into the network up-to and until the cable modem. Traditional inband diagnostic protocols allow operators to diagnose various problems from the CMTS to the cable modem. However, beyond the cable modem, there are often several user devices connected to the WiFi router inside the home, or other remote location. As the WiFi router is located behind and attached to the cable modem, there may be limited visibility via the network to the QoE issues inside the home.

Some of the most common subscriber access issues include poor WiFi access point placement inside the home, Downlink and Uplink WiFi congestion, upstream Data Over Cable Service Interface Specification (DOCSIS) congestion in a subscriber's upstream bonding group, downstream DOCSIS congestion in a Service Group, cable modem degradation, interference experienced on WiFi due to turning on of microwaves, and the like issues. These issues often result in poor QoE for the various applications, particularly over-the-top applications such as Netflix, Amazon Prime video, and the like, on mobile devices.

As a result of poor QoE, subscribers call into a customer care agent of a CSP or ISP. Customer care agents tend generally have very limited visibility into the traffic statistics inside the home. It is unlikely the agent will have knowledge regarding, for example, the QoE experienced by each device, the total throughput for the subscriber compared to the throughputs experienced by other subscribers in the same service group, which subscribers are in the same bonding group, whether there a cable fault causing degradation in throughput, RTT and loss, and other factors. In cable, the service group is sometimes referred to as a downstream bonding group. The service group may include of a set of radio frequency channels that are collectively carrying data for that single subscriber. Bonding allows for increased transmission speed by spreading the data over two or more Radio Frequency channels. Channels may be bonded in the downstream direction, referred to in this disclosure as the Service Group. Channels may also be bonded in the upstream direction, referred to in this disclosure as the Bonding Group. Multiple subscribers may share the resources on a Service Group, and/or a Bonding Group. Although in various fixed access networks, bonding and service groups may be defined differently, in that users or subscribers may be grouped differently, embodiments of the system are intended to determine the access congestion depending on the access type. It will be understood that although examples described herein may refer to a cable network, other networks may also suffer from network access congestion, and service group and bonding group access congestion, and the embodiments of the system and method disclosed herein may function similarity for other fixed access networks.

Customer care agents may suggest rebooting the cable modem, relocating the subscriber's WiFi Access Point (AP) for better positioning, adding WiFi coverage pods that improve coverage but may also negatively affect throughput or other metrics, or other similar solution. Other than these high-level solutions, there may be very limited visibility into the root cause of the subscriber and/or individual device problem. The problem may be difficult for a CSP to mitigate and fix. Frequently, in cases that are unable to be fixed immediately, an operator may send in a truck roll. These truck rolls often prove to be an unnecessary expense, and even in cases where it is necessary, there may be significant time wasted in figuring out the root cause. It is estimated that even a 1% reduction in truck rolls may result in substantial savings for the network operator. A CSP's could benefit by being able to proactively diagnose and address these subscriber access issues directly.

Conventional techniques often require availability of actual subscriber truck roll records to analyze subscriber faults. The limitation of this approach is that these records are not necessarily complete, may not have accurate information, and may not be sufficiently granular to come up with meaningful deductions. Hence conventional techniques have not be able to be used to build a reliable model to predict customer care issues. In particular, conventional solutions are not able to provide unique label identification for an issue type. Conventional techniques may just represent all QoE issues inside the home under a single heading. It would be preferable to have multiple headings, although the data required to represent various issue types is generally not available in the traditional solutions. For example, conventional solutions are often not at a position where they obtain sufficient information to know whether the problem is related to a poor WiFi access point placement, WiFi downlink congestion, WiFi uplink congestion, downlink access congestion, uplink access congestion, or other issue.

Various subscriber access issues have symptoms and trends that can be observed in these connection performance statistics that will allow the method and system described herein to proactively diagnose these access issues before they call in and contact a customer call center. These performance statistics are available at the CSP through passive monitoring of Throughput, Loss, RTT, jitter. Information associated with the Consumer Premise Equipment (CPE), for example type of access point; other metrics; of per subscriber data along with information about the CMTS, service group and bonding group are also retrieved by or determined by the system. This information is intended to be used to diagnose issues, which is intended to enable the method and system to provide for proactive measures.

Figure 2:
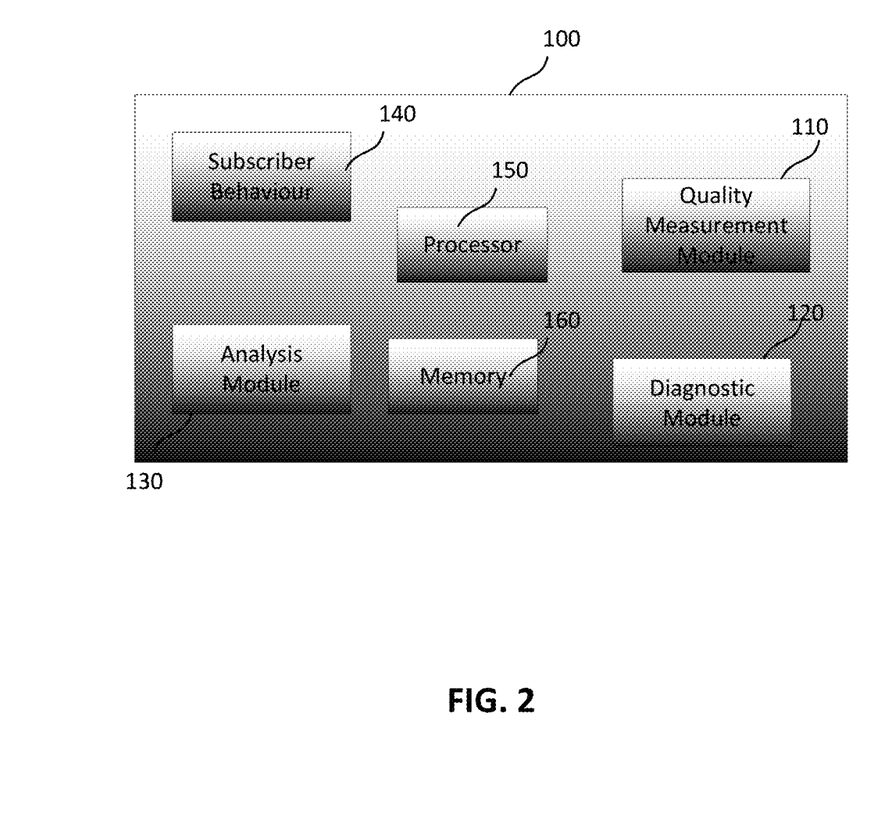
FIG. 2 illustrates a system for remote QoE diagnostics.

FIG. 2 illustrates a system 100 for remote Quality of Experience (QoE) diagnostics. The system includes a quality measurement module 110, a diagnostic module 120, an analysis module 130, a subscriber behavior module 140 at least one processor 150 and at least one memory 160 component. The system is intended to reside on the core network. The modules, including the processor 150 and memory 160, are in communication with each other but may be distributed over various network devices or may be housed within a single network device. The system 100 is intended to receive information from the computer network equipment that allows the system to determine traffic flow and performance statistics and subscriber data.

The quality measurement module 110 is intended to determine quality measurements associated with a plurality of traffic flows per subscriber. Quality measurements determined by the quality measurement module 110 may include, for example, throughput, RTT, loss and the like. The subscriber behavior module 140 is intended to determine subscriber attributes (sometimes referred to as subscriber data) and may include, for example, Service Group, Bonding Groups, Subscriber device type, subscriber device metrics and the like.

The analysis module 130 reviews the data from the quality measurement module 110 and analyzes the subscribers QoE as detailed herein. The analysis module 130 may determine a traffic signature associated with the traffic flow. The memory component 160 may store previously determined traffic signatures each traffic signatures correlated performance metrics and QoE issue.

The diagnostic module 120 is configured to determine a diagnosis based on the performed analysis. The diagnostic module 12o may review the analyzed performance statistics and determined traffic signature to determine is there is a corresponding traffic signature that is associated with a specific QoE issue. The diagnostic module 120 may further notify a customer care agent of the associated CSP or ISP of a diagnosis that may be affecting a subscriber's QoE. In other cases, the diagnostic module 120 may determine or perform a traffic action that is intended to improve the QoE of the subscriber.

The diagnostic module 120 is intended to be able to make predictions before the customer calls in about whether a problem is due to an issue inside the home such as poor WiFi placement, WiFi downlink congestion, WiFi uplink congestion, excessive WiFi interference, cable modem software fault or due to an access issue such as upstream access congestion or downstream access congestion. The type of access that may be considered may be fiber, satellite, DSL, fixed wireless access or cable.

Figure 3:
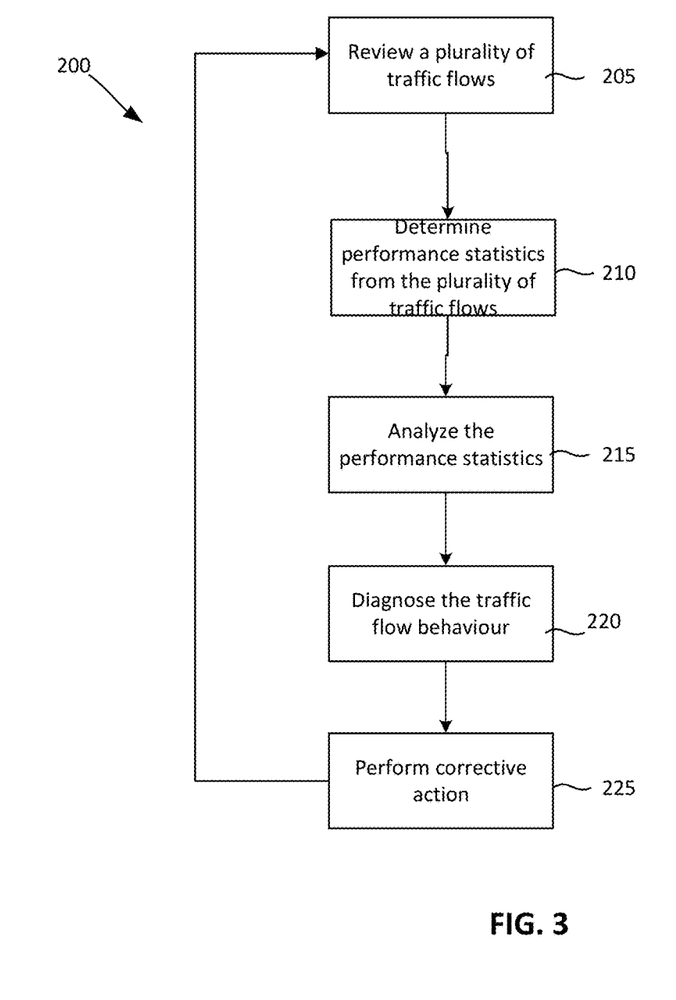
FIG. 3 is a flow chart of a method for remote QoE diagnostics according to an embodiment.

FIG. 3 is a flow chart of method 200 for remote diagnostic according to an embodiment. At 205, the system may receive and review a plurality of traffic flows for each subscriber related to or having an account with a CSP or ISP. The quality measurement module 110 may then determine quality measurements related to each of the plurality of traffic flows at 210. The analysis module 130 is analyzes the performance statistics, quality measurements, and subscriber data at 215 to determine a traffic signature. The diagnostic module 120 may diagnosis the QoE issue based on the analysis at 220. The diagnostic module may retrieve previously stored traffic signatures from a memory component. Each traffic signature may include a plurality of performance statistic information and may be correlated to a specific QoE issue. At 225, the system may perform corrective action, for example notifying the customer care agent of the issue, or performing traffic actions to improve the QoEof the subscriber, for example rebonding the subscribers upstream or downstream channel. The principles described herein are intended to apply fixed access network, for example, Cable network, Fiber-To-The-Home, Fiber-To-The-Premise, Fixed Wireless Access network, Public or Enterprise WiFi network, Satellite network, DSL Access network.

The diagnostic method is intended to run periodically, for example, once every six hours, twelve hours, twenty-four hours or the like. The diagnostic method analyzes all the traffic flow data and diagnoses outcomes for each subscriber. If a subscriber is identified as having a given issue type, then the diagnostic method may further determine how many prior days the subscriber has had the issue. The diagnostic method is intended to identify which subscribers had poor QoE due to poor WiFi AP placement, due to Data Over Cable Service Interface Specification (DOCSIS) downlink congestion, or due to a like issues. These results may be stored in the memory component, for example, a database. A customer care agent may proactively consult the database periodically and identify which subscribers are having various types of QoE issues. In other cases, the system may notify customer care agents of the particular issues experienced by subscribers. Proactive means that the diagnostic outcomes are available to the customer care agent before the subscriber calls in to report a poor QoE issue in the home. Proactive diagnostics is intended to allow the customer care agent to be fully informed of the QoE issues and allows the customer care agent to address or fix the issue by, for example, sending in a better CPE Device, upselling the subscriber with WiFi extenders, dynamically rebonding the upstream or downstream channel assignments, or the like. Proactive actions are intended to result in improved subscriber satisfaction.

Embodiments of the system described herein may be placed on the Communication Service Providers network and use various tools such as deep packet inspection, network queries and the like to obtain characteristics/statistics of the network traffic flowing to and from a subscriber's connection to the CSP network. The system and method will then analyze subscriber performance statistics that describe various characteristics of subscriber connections and quality of service metrics such as throughput, round-trip-time (RTT), loss, jitter, number of devices, and the like, and correlate the performance statistics with expected WiFi network behavior. Analysis of WiFi network behavior is used to make hypothesis on the impact to Throughput, Loss and RTT under various failure scenarios.

Embodiments of the system and method described herein make use of end-to-end performance statistics and may analyze various data to detect and diagnose specific subscriber access issues as the issues occur. For example, this may mean that a subscriber has a consistently poorly placed access point router in the home, which means that the majority of their time is spent with a poor and unreliable connection due to the low signal-to-noise ratio caused by the poor placement. Embodiments of the system and method described herein are intended to diagnose this issue by observing patterns in the subscriber's performance statistics data and correlating with expected WiFi behavior. Once diagnosed, the system and method can be used by the network provider to proactively manage or resolve the issue. In this case, this may include contacting the subscriber and providing useful information on steps that the subscriber can take to improve his or her overall QOS.

In a specific example, a subscriber device may consistently be streaming data in the uplink direction, for example, from a 'Nest Cam' monitoring device. This uplink streaming data could potentially cause poor QoE issues when attempting to upload data to the cloud as a result of Uplink WiFi congestion. As this example illustrates, there may be multiple QoE issue types within the home or in service provider WiFi areas that may lead to the subscriber calling in to report a problem as "Internet is not working", whether or not the cause is related to the service provider's network. In reviewing the traffic flow parameters, the system is intended to determine traffic flow signatures that may be correlated to a specific QoE issue. Each QoE issue may have a separate traffic signature that the system may determine based on the performance statistics of the traffic flow.

Taking proactive steps to manage and resolve these subscriber access issues in a timely manner is intended to reduce the total number of customer center calls and truck rolls. The proactive steps may also increase overall subscriber QOS/QoE and satisfaction by removing access issues that may otherwise be attributed to the CSP's network.

The following description is a specific example of a cable network and the cardinality assumptions. These numbers may vary from network to network and are meant to be illustrative of the method for remote QoE diagnostics used by the system. In this example, there may be 10 CMTSs in the network. Their IDs look like: adr01.shoppingmall.tx.dallas. Each CMTS may have up to 48 service group (SG), numbered from 1 to 48. Their IDs may look like adr01.shoppingmall.tx.dallas -44.0. Each SG has up to 96 upstream bonding groups (US-BG), identified by say '90210'. Their IDs look like: adr01.shoppingmall.tx.dallas -44.0-90210. Each US-BG has some subscribers and each subscriber has a number of devices, while each device has a number of applications. The data records report SRTT (the subscriber side Round-Trip Time) for each flow within the above hierarchy identified.

For a different access type, such as Fiber to the Home, (FTTH) there will be a different grouping of subscribers who belong to the subscriber groups, and bonding groups. The methodology to decide which subscribers belong to a subscriber group, and which subscribers belong to a bonding group will vary depending on the access technology. The methodology is based on which subscribers are served traffic through a common set of channels in the downstream direction, and which subscribers are served traffic through a common set of channels in the upstream direction. Embodiments of the method and system disclosed herein are not intended to assign bonding and service groups. Once the subscribers are assigned to a service group and a bonding group, the system and method disclosed herein are intended to determine whether the subscriber is suffering from a QoE issue and whether service group or bonding group access congestion may be the cause of the QoE issue.

The below use-cases or issue types account for a majority of WiFi related Subscriber QoE issues.

Poor WiFi Placement—High path loss and Low Signal to Noise Ratio tends to lead to higher packet loss and retransmissions, and higher subscriber RTT compared to baseline RTT for all the other subscribers in the same service group (SG).

WiFi Downlink congestion—High Downlink throughput tends to lead to channel congestion and hence higher subscriber RTT compared to baseline RTT for all the other subscribers in the same subscriber group. Many devices will experience poor QoE during periods of congestion.

WiFi Uplink congestion—High Uplink throughput contributes to upstream channel congestion and may then raise upstream RTT for all the devices in the same home.

Downlink DOCSIS congestion—Aggregate RTT for all subscribers in the same service group (SG) may be high due to subscribers in the downstream bonding group consuming significant amounts of downstream data.

Uplink DOCSIS Congestion—Aggregate RTT for all subscribers in the same Bonding Group may be high due to subscribers in the upstream bonding group sending high throughputs in the uplink direction.

Cable degradation—Aggregate RTT for one or more subscribers in the same Service Group may be high and throughput may be low.

Interference on WiFi from DECT phones, microwaves, or the like may result in intermittently low throughput coupled with high RTT. Each QoE issue may have a separate or distinct traffic signature and determining the performance statistics of the traffic flow may determine the traffic signature associated with a specific QoE issue.

Figure 4:
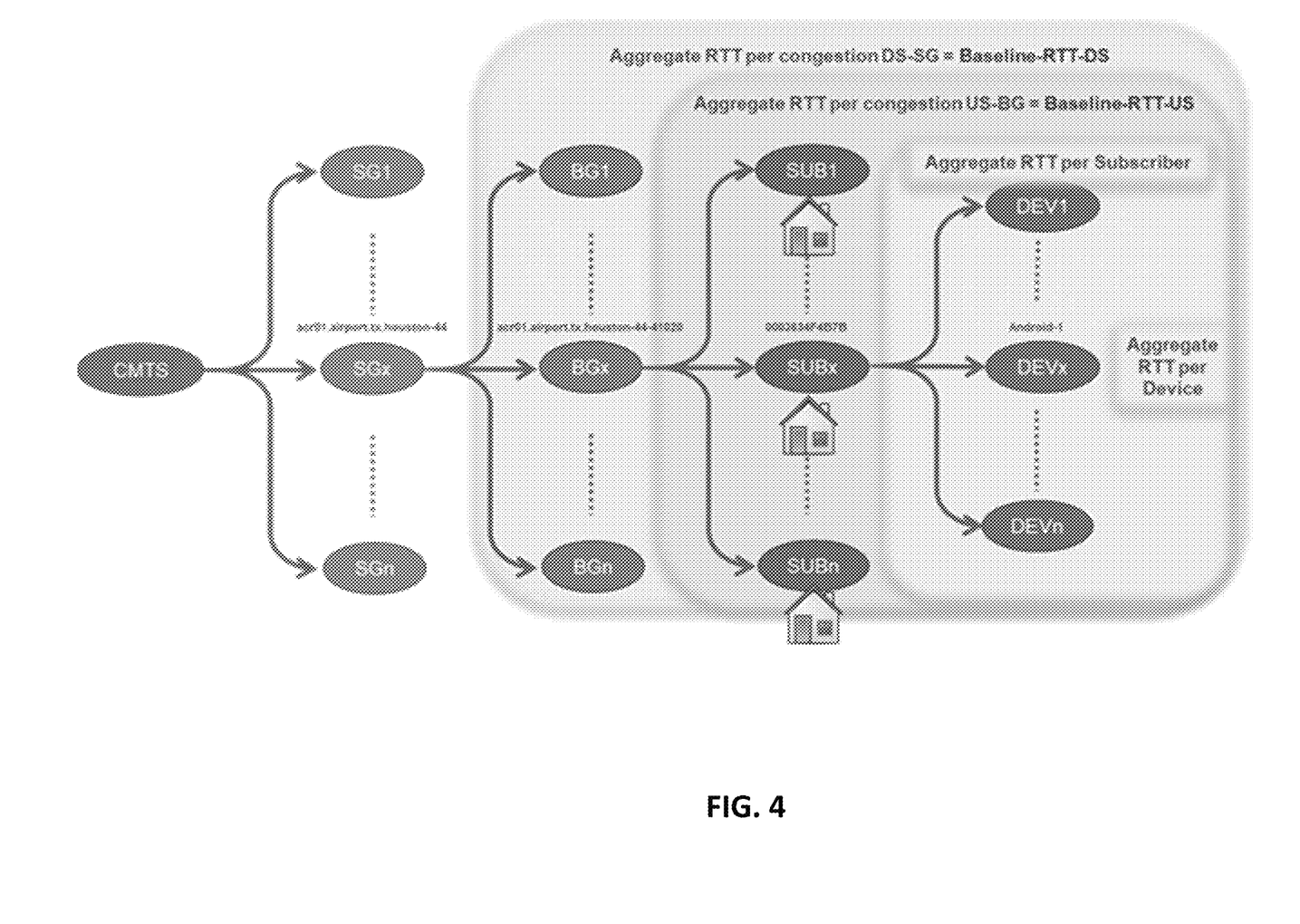
FIG. 4 illustrates organization of various types of data in a cable network and illustrates the way subscriber performance data is collected and organized across Service Groups and Bonding Groups.

FIG. 4 shows a schematic of the way subscriber performance data is collected and organized across Service Groups and Bonding Groups in a Cable network. In other fixed access networks, subscribers may be assigned in another manner to service groups and bonding groups, but may experience similar issues. Traffic is sent over a group of channels in downstream or upstream direction. The combination of channels in the downlink direction over which traffic is sent by the CMTS is called a service group. The combination of channels in the uplink direction over which traffic is sent is called a bonding group. The CMTS is configured to balance downstream traffic across the service group. The Cable modem is intended to balance upstream traffic across the bonding group. The service group and bonding group may allow downstream and upstream traffic to exceed the capacity of a single channel respectively. The congestion domain can only be the combination of the channels, and the system described herein may not receive detail or know which channel traffic gets balanced on. Embodiments of the system and method described herein are not intended know or require the channel bonding assignments of the network.

Users in a Downstream Service Group (SG) share the same DOCSIS broadcast channel. As such, the users vie for the same network resources up to the home Cable modem. However, different homes have different WiFi AP's. Therefore, congestion may be different in each Subscriber home. Embodiments of the system and method herein are configured for the RTT of all the subscribers in a given service group (SG) to be averaged to derive the Baseline_RTT_DS. The system and method may further provide for the RTT of all the subscribers in a given bonding group (BG) to be averaged to derive the Baseline_RTT_US. Since the subscribers are in the same bonding group, it means that the subscribers share the same upstream channel resources.

Embodiments of the system and method described herein are generally intended to monitor and measure performance statistics such as Throughput, Loss, RTT and the like for each subscriber on a predetermined interval, for example every 30 seconds, every minute, every 5 minutes, every 10 minutes, every 30 minutes or the like. In a specific example illustrated below, the predetermined interval is set to every 5 minutes. In this example, every T=5 minutes, a sample is obtained for Subscriber_Downlink_Throughput, Subscriber_Uplink_Throughput, Subscriber_RTT (that is a round-trip-time and hence bidirectional), and Subscriber_Packet_Loss. In addition, other information about the CMTS, Service_Group, Bonding_Group, and devices within a subscriber may also be determined and/or retrieved by the system.

Once the system retrieves this data, every 5 minutes: the system is configured to compare the Subscriber_Throughput, RTT and Loss estimates against various baselines as follows:

Subscriber_Downlink_Throughput is compared against Service_Group_Throughput that is an average of the throughput experienced by all subscribers in that service group (SG).

Subscriber_Uplink_Throughput is compared against Bonding_Group_Throughput that is an average of the throughput experienced by all subscribers in that bonding group (BG).

Service_Group_Throughput is compared against Bonding_Group_Throughput.

Service_Group_Throughput is compared against CMTS_Downstream_Throughput

Bonding_Group_Throughput is compared against CMTS_Upstream_Throughput

Subscriber_RTT is compared against Service_Group_RTT

Subscriber_RTT is compared against Bonding_Group_RTT

In some cases, when the # of devices>n, the standard deviation amongst RTT values in a home may be compared against the mean Subscriber_RTT.

In some cases, each of the above comparisons may be referred to as a feature. Combinations of the above, which may be used by the system and method for a specific use case, may result in new features, as detailed herein. The system and method are intended to identify a unique set of features that distinguish one fault which leads to lower subscriber QoE from another. Thus a fault, for example from one of the seven use cases described herein or from a similar user experience, can be identified by counting the number of times in a given time period that the fault occurs. The count of the number of times will result in a threshold. When the count exceeds a certain configurable value, it is equivalent to the threshold being set as described herein.

Every use case may have different thresholds for the above criteria, which determine a traffic signature for the use case. In reviewing the traffic signature of the current traffic flow, the system may determine the fault or QoE issue being experienced by the subscriber or user. Hence, different faults will be flagged if a threshold is exceeded or depending on the number of times specific thresholds are exceeded. These thresholds may be predetermined by the system or may be programmed differently for a given operator. Moreover, additional margins may be given to account for hysteresis. A fault or an issue type such as WiFi Downlink Congestion is declared to be true for a subscriber when there are sufficient samples in the data (of throughput, loss and round-trip-time) wherein the features that are derived from the data exhibit trends consistent with the expectations. In a particular example, WiFi Downlink Congestion may be determined to be true when the subscriber throughput is higher compared to the service group RTT for some duration within a day, and when the round-trip time of the subscriber is high at the same time when the throughput is high. Access Downlink Congestion may be determined when all the subscribers in the service group experience higher round-trip time compared to mean round-trip-time of the subscribers in the CMTS group, and when there is a positive correlation between throughput and RTT of users within the service group (otherwise referred to as the downlink bonding group).

Over a time period, embodiments of the system and method are intended to count the number of instances when the above criteria is satisfied. A decision tree can be constructed to describe the triggers and outcomes for each feature. Root cause analysis is realized for each use case, as each use case may be flagged differently depending on the number of specific features counted in a given time window.

In a specific example of the method for remote QoE diagnostics, a subscriber with poor placement of a WiFi device may be declared as one who has poor RTT between 60% and 80% of the time, and whose RTT device variance (amongst devices in the home) is more than 20% of Service Group RTT and who experiences low throughput more than 20% of the time. As will be understood, the actual threshold values may be configurable and the thresholds noted herein are only for the purposes of illustration. Fine tuning of these thresholds may be done by corroborating with the actual Subscriber Truck Roll record that indicate whether a customer actually reported a problem. The aspect of corroborating is optional and may only be needed for the purposes of validation.

The use of the Subscriber Truck Roll record may be used for the purposes of verification of the threshold values. After a solution is deployed in the customer network, the corroboration with the subscriber truck roll record may be completed. The proposed diagnostics may be run to provide for a diagnoses of which subscribers are having various issue types. The system and method may then determine whether any of these subscribers issues truck rolls. Further, the system may then change the threshold values one at a time and re-run the proposed diagnostics and record the subscribers who issued the subscriber truck roll records. If the number of subscriber truck roll records is fewer and the number of diagnosed subscribers has increased, all other factors remaining the same, the system may determine that the threshold settings were incorrectly set. Likewise, if the number of subscriber truck roll records is higher and the number of diagnosed subscribers is fewer, the system may also determine that the threshold settings were incorrectly set. Conversely, if there is a direct correlation (either an increase or decrease) in both the number of diagnosed subscribers and the number of subscriber truck roll records, then it is likely that the threshold settings were changed in the right direction. This process of verification and fine-tuning of thresholds through network experiment may be done one at a time, in a systematic approach.

Figure 5:
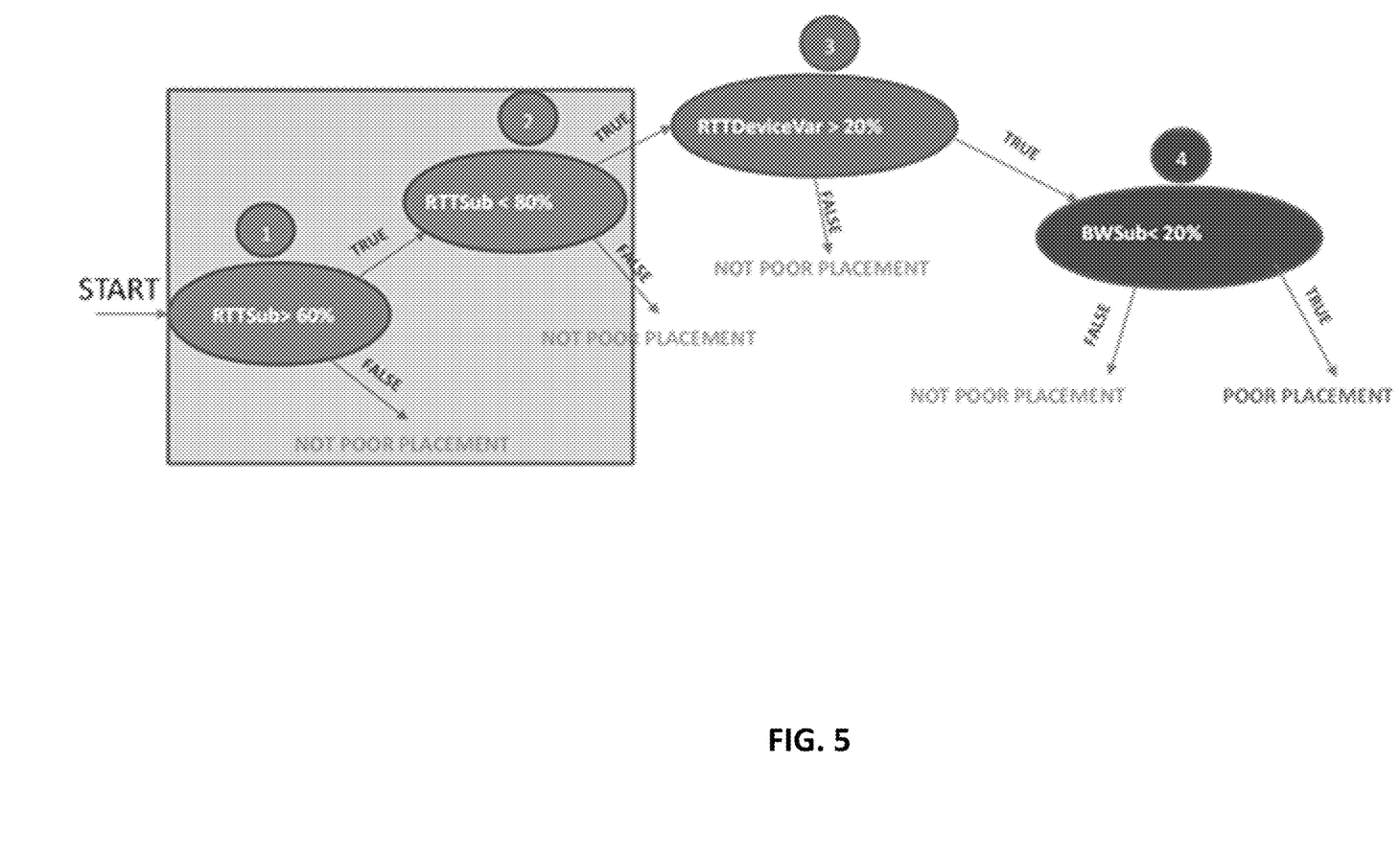
FIG. 5 is a flow chart of a method for remote QoE diagnostics and, in particular, detecting poor WiFi Placement.

As an example, of the types of methods for remote QoE diagnostics, the criteria for poor WiFi placement is illustrated as a flow chart shown in FIG. 5. As detailed herein, depending on the results of the various analysis, the system and method are configured to analyze the performance statistics and subscriber data. From this data, the system and method may diagnose the issue and provide for a proactive solution to a customer care agent or provide a traffic management action intended to improve the subscriber's QoE.

The method starts by entry from the left hand side of the flow chart shown in FIG. 5. A sequence of actions, corresponding to actions in a decision tree, is enforced going from left to right in this example. To illustrate the method for remote QoE diagnostics, below is a description of how the RTT values would be measured and evaluated.

(1) And (2) 60%<RTTSub<80%
For a subscriber may be flagged as having a poor WiFi Access Point placement issue, the subscriber is intended to have an RTT that exceeds the Service Group RTT by a configurable threshold for more than 60% of the duration of the day and less than 80% of the duration of the day. The configurable threshold may be, for example 10 ms, 25 ms, 50 ms or the like.
Monitor for 24 hours (it could be a moving average time window over the previous 24 hours)
Start CTR=0
1. Every 5 minutes
  Compute RTTSub_Diff=RTT-SG_RTT
  If RTTSub_Diff>25 ms
  Then CTR++
  Else CTR=CTR
  Return to (1).

CTR represents the number of times in a 24 hour period that the threshold of 25 ms was exceeded beyond Service_Group_RTT (SG_RTT). At the end of 24 hours, there are 288 samples of 5 min duration each. RTTSub>60% means that the RTTSub_Diff>25 ms happened more than 60% of the time. So CTR>0.6*288 samples corresponds to CTR>172. When CTR exceeds 172 then it is a direct relection that RTTSub_Diff exceeded 25 ms for 60% of the day.

RTTSub<80% means that the RTTSub_Diff>25 ms happened less than 80% of the time (in this example of the day). Thus, RTTSub<80% means CTR<0.8*288=230, therefore CTR<230. This feature is intended to describe the frequency within a day during which the subscriber RTT exceeded the service group RTT and bounds the frequency to a certain range.

All the numbers above are configurable and shown only for the purposes of illustration.

Similar logic is performed by the method for the remaining boxes 3 and 4 applies.

(3) RTTDeviceVar>0.2
This equation implies that variation in the roundtrip times amongst the devices, as measured by comparing standard deviation between RTT values of individual devices in the home against 25% of the subscriber RTT happened more than 20% of the duration of the day.
Start CTR=0
  1: Every 5 minutes
  Compute RTTDev_Diff=standard deviation between RTT values of individual devices in the home
  If RTTDev_Diff>25% of Subscriber_RTT
  Then CTR++
  Else CTR=CTR
  Return to 1

CTR represents the number of times that in a 24 hour period that RTTDev_Diff>25% of Subscriber_RTT. At the end of 24 hours, there are 288 samples of 5 min duration each.

RTTDevice_Var>20% implies that CTR>0.2*288=58 so CTR>58. Thus the RTTDev_Diff>25% of Subscriber_RTT happened more than 58 instances in the 24 hour period.

(4) BWSub<0.3
This equation implies that the fraction of the day for which the subscriber throughput exceeds the Service Group throughput by 20% is less than 30% of the duration of the day
Start CTR=0
  1: Every 5 minutes
  Compute Throughput-SG_Throughput*1.2
  If Throughput-SG_Throughput*1.2>0
  Then CTR++
  Else CTR=CTR
  Return to 1.

CTR represents the number of times that in a 24 hour period that the downlink subscriber Throughput is greater than the Service Group Throughput by 120% ie. Throughput SG_Throughput*1.2. At the end of 24 hours, there are 288 samples of 5 min duration each. BWSub<30% means CTR<0.3*288=87 so CTR<87. Thus Throughput>SG_Throughput*1.2 happened less than 87 instances in the 24 hour period. A similar logic can be applied to the other use cases.

In a specific example, WiFi DL (downlink) congestion is triggered when instances of high subscriber downlink throughput correlate with high subscriber RTT. When the subscriber throughput is high (for example, greater than the Service Group throughput by 20%), then the subscriber RTT should also be correspondingly high (i.e. greater than the Service Group RTT). These occurrences of simultaneous high downlink throughput and RTT should occur no more than 20% of the day because it is expected that WiFi DL congestion is not persistent throughout the day. Hence, there is an additional condition of the subscriber round trip time being less than the service group RTT by a factor. Similarly, WiFi_UL (uplink)_congestion is triggered when instances of high subscriber uplink throughput correlate with high subscriber RTT. These occurrences of simultaneous high uplink throughput and RTT should occur no more than 20% of the day because it is expected that WiFi UL congestion is not persistent throughout the day.

In another example, DOCSIS Downlink congestion is declared when the duration during the day during which, the Service_Group_Throughput is greater than the CMTS_Throughput simultaneously along with the subscriber RTT being within 10% of the Service_Group_RTT, is 20% of the duration of the day. It will be understood that thresholds of 10% or 20% are configurable.

Figure 6:
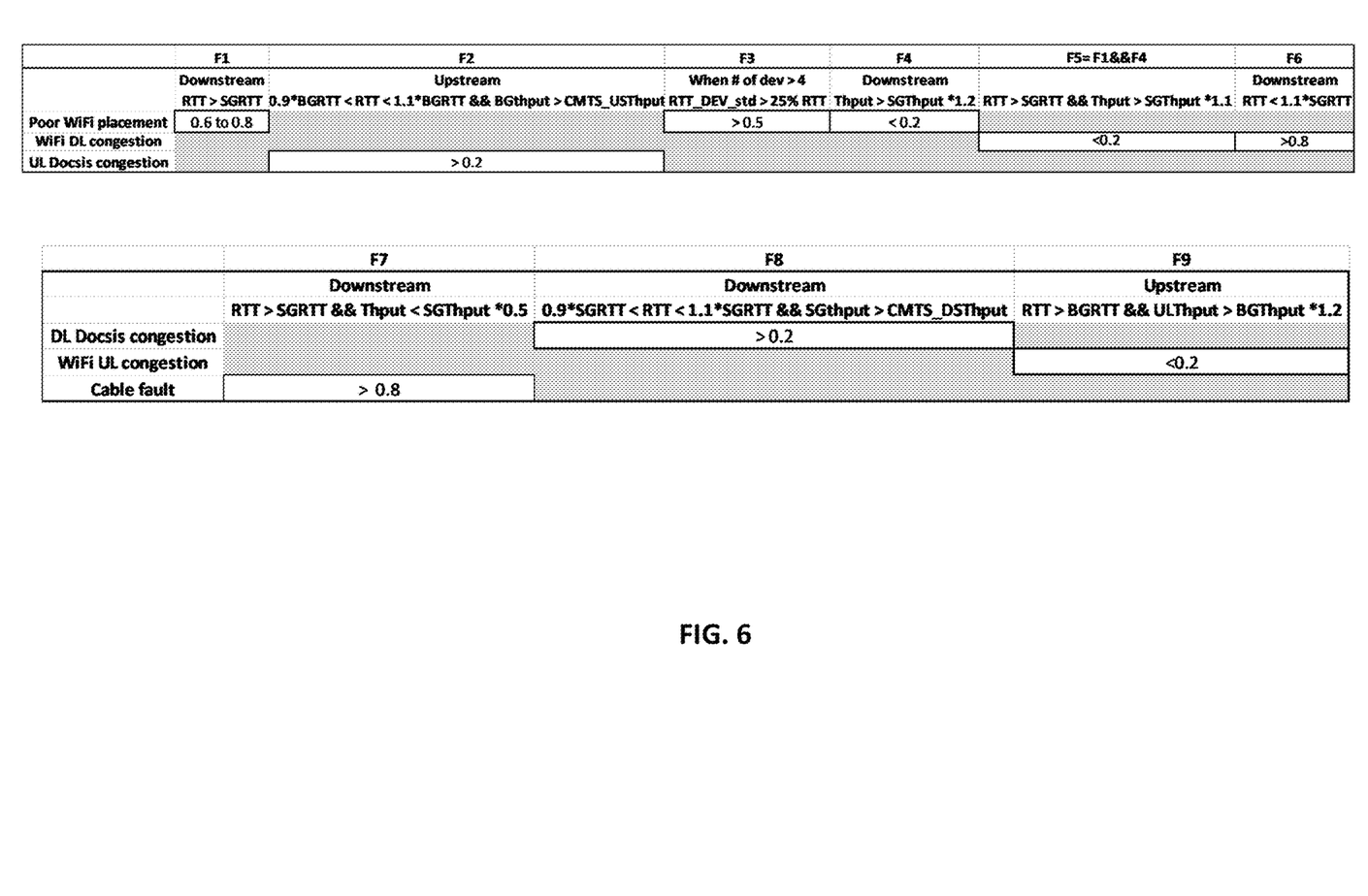
FIG. 6 illustrates Decision Criteria for Root Cause Analysis of various Subscriber QoE issues inside the home.

FIG. 6 summarizes the application of different features to do root cause analysis for various faults as shown in the examples provided herein.

Previous solutions tended to require corroboration with Truck Roll Records to even build a diagnostic model. Truck Roll Records are very coarse, and often inaccurate, and incomplete. The reason they are incomplete is that multiple issue types such as 'Poor_WiFi AP_placement' or 'WiFi DL congestion' or 'WiFi_UL_congestion' or 'Access_DL_congestion' or 'Access_UL_congestion' all would traditionally map to the same dispatch label namely 'INT_OUT' or some equivalent thereof. Hence, by looking only at the dispatch label 'INT_OUT' there is no conclusive way to decide the type of fault because multiple issue types lead to the same dispatch label. There is a many-to-one mapping between the issue types and the dispatch label. As a result, the models tended to be inaccurate. Embodiments of the system and method detailed herein apply the understanding of WiFi network behavior to deduce trends in characteristics such as Throughput, RTT, Loss and like traffic signatures. This is intended to eliminate the need for Subscriber Truck Roll records other than for example, to validate the models.

Embodiments of the system and method detailed herein are intended to lead to more accurate and faster management of subscriber access issues. Further, as the method may be performed a plurality of times throughout each day and each day results may be compared and aggregated with previous day results, the severity of the QoE issue may be determined in review of the aggregated results. The more days a user has experienced issues, the more severe the QoE issue may seem to the user or subscriber.

Embodiments of the system and method are intended to proactively detect & diagnose user QoE issues in real-time and suggest actions. Further the system and method may provide the following advantages:

Reduce Tech Call Time;
Reduce Truck Rolls;
Reduce Call Center Resolution Time; and
Lower Churn.

For example, embodiments of the method and system enable the remote diagnosis of subscriber access issues. When a subscriber is experiencing a degradation in QOS/QoE due to an access issue, the only available option previously has been to execute a costly truck roll to the subscriber's location to determine the issues and course of action. Not only is this an expensive option for the network provider, any results are likely to be delayed. Embodiments of the method and system detailed herein offer the option to analyze subscriber traffic data continuously and remotely. Further, the embodiments of the system and method allow for remotely diagnosing the access issue even before a truck roll is issued. This enables network providers to determine whether a truck roll would be necessary or beneficial, and to determine the best course of action to take to provide the subscriber a better QoE/QOS.

Further, embodiments of the system and method detailed herein allow subscriber access issues to be diagnosed proactively thus allowing for incipient fault diagnostics. Previously, the option available was for a network provider to wait for a subscriber to notice the degradation in QOS on their own and decide to call in and contact the CSP, which is costly. With embodiments of the present system and method, it is possible to provide regular polling and analysis of all subscriber diagnostic data that is accessible, and diagnose subscriber access issues even before the subscriber calls in for support, or possibly even before the subscriber notices the degradation in QOS. This is intended to lead to faster resolution of subscriber access issues that are cheaper for CSP's to execute since they don't need to manually diagnose the issue through a truck roll or extensive customer support center call interaction.

Figure 7:
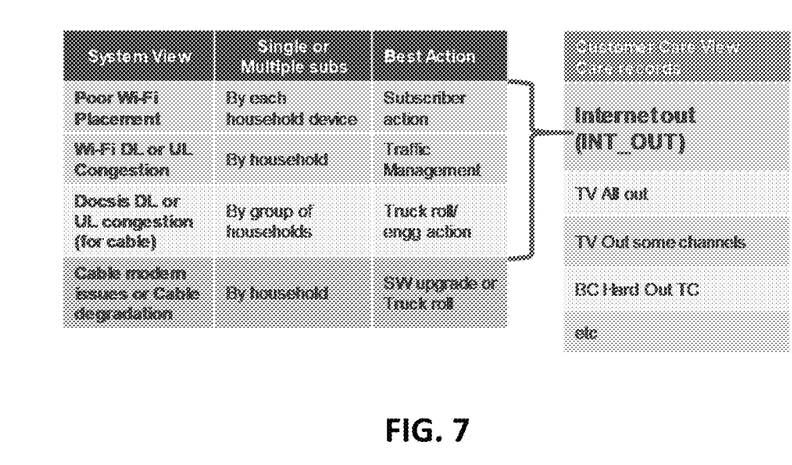
FIG. 7 illustrates a table record that may be visible to a customer agent according to an embodiment.
Figure 8A:
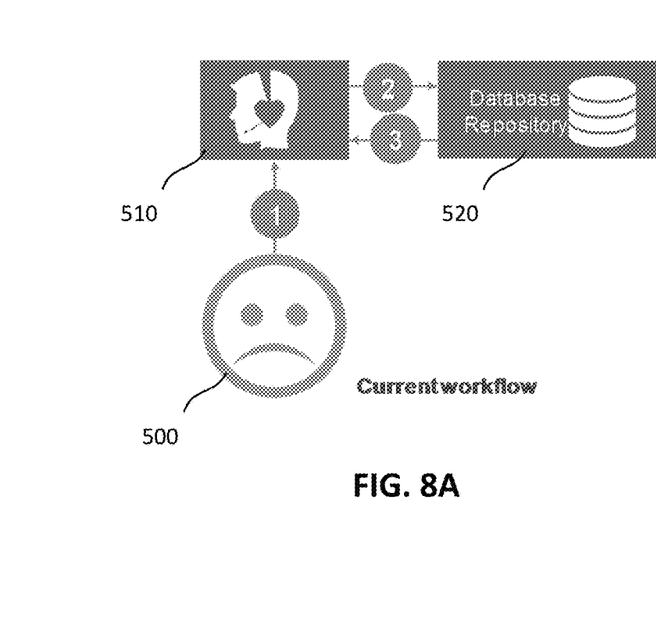
FIGS. 8A and 8B illustrate costumer and customer agent representative according to an embodiment.
Figure 8B:
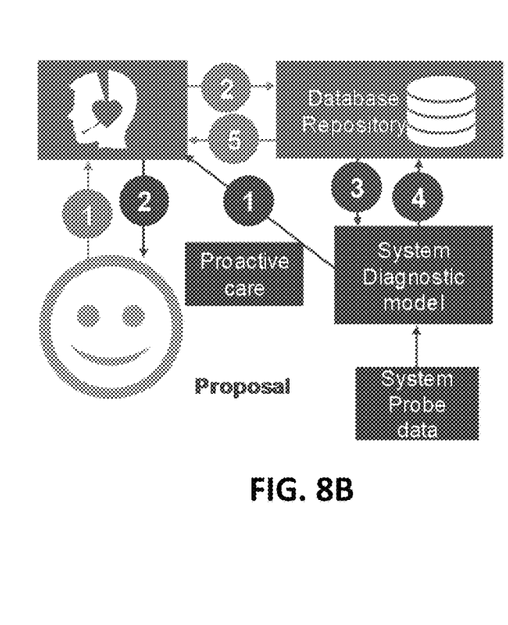

In particular, FIG. 7 illustrates an example of data that may be available to a customer care agent of a CSP having access to the system. The system is intended to provide the customer care agent with the appropriate data to aid the customer in diagnosis and fixing any QoE issue the subscriber is currently experiencing. In a traditional solution, as shown in FIG. 8A, a customer 500 may call a customer care agent 510. The customer care agent 510 may query a traditional database 520 to determine whether the customer's issues can be solved. With the system detailed herein, in FIG. 8B, when the customer 500 calls a customer care agent 510, the database 520 may include the information the system has determined and diagnosed. The system may include a probe, or the analysis module may retrieve data from the probe related to the traffic flow and associated performance statistics. Further, the system is intended to analysis then diagnosis any subscriber QoE issue. The database 520 may store these records. In some cases, the customer care agent 510 may be able to provide the customer 510 with detailed information when the customer calls. In still other cases, the customer care agent may proactively call the customer and suggest a traffic action or customer action in order to provide for better QoE prior to the customer calling. In addition, the customer care agent may proactively be able to upsell WiFi extenders when the system detects that a home or a unit is experiencing persistent poor WiFi quality of experience issues over many days.

The methods used by the system detailed herein are intended to examine patterns of traffic and diagnose if a subscriber is having a QoE issue even before the subscriber notices a substantial degradation and calls into the customer care center with a complaint. Polling means that a Customer Care agent can access or poll the results of the diagnostics either periodically or whenever the Customer Care agent wants to understand details on which subscribers are having what QoE issues.

In the preceding description, for purposes of explanation, numerous details are set forth in order to provide a thorough understanding of the embodiments. However, it will be apparent to one skilled in the art that these specific details may not be required. In other instances, well-known structures may be shown in block diagram form in order not to obscure the understanding. For example, specific details are not provided as to whether the embodiments or elements thereof described herein are implemented as a software routine, hardware circuit, firmware, or a combination thereof.

Embodiments of the disclosure or elements thereof may be represented as a computer program product stored in a machine-readable medium (also referred to as a computer-readable medium, a processor-readable medium, or a computer usable medium having a computer-readable program code embodied therein). The machine-readable medium can be any suitable tangible, non-transitory medium, including magnetic, optical, or electrical storage medium including a diskette, compact disk read only memory (CD-ROM), memory device (volatile or non-volatile), or similar storage mechanism. The machine-readable medium can contain various sets of instructions, code sequences, configuration information, or other data, which, when executed, cause a processor to perform steps in a method according to an embodiment of the disclosure. Those of ordinary skill in the art will appreciate that other instructions and operations necessary to implement the described implementations can also be stored on the machine-readable medium. The instructions stored on the machine-readable medium can be executed by a processor or other suitable processing device, and can interface with circuitry to perform the described tasks.

The above-described embodiments are intended to be examples only. Alterations, modifications and variations can be effected to the particular embodiments by those of skill in the art without departing from the scope, which is defined solely by the claims appended hereto.

What is claimed is:

1. A method for remote diagnostic of Quality of Experience (QoE) for a subscriber on a computer network, the method comprising:
   reviewing a plurality of traffic flows associated with a subscriber to determine performance statistics correlated with each of the traffic flows;
   determining subscriber data related to the subscriber associated with the plurality of traffic flows;
   analyzing the subscriber data and performance statistics to determine a traffic signature associated with the plurality of traffic flows;
   retrieving a plurality of known traffic signatures associate with QoE issues;
   determining whether the traffic signature matches any of the plurality of known traffic signatures; and
   diagnosing the QoE issue based on the match of the traffic signatures.

2. A method according to claim 1 wherein the performance statistics comprise: round trip time, packet loss and throughput.

3. A method according to claim 1 further comprising: performing traffic management actions based on the diagnosed QoE issue.

4. A method according to claim 3 wherein the traffic management action comprise: sending the subscriber and upgraded customer premises equipment, upselling the subscriber with WiFi extenders, dynamically rebonding the upstream or downstream channel assignments.

5. A method accord to claim 1 wherein the QoE issue is selected from the group comprising: a poor WiFi access point placement, WiFi downlink congestion, WiFi uplink congestion, downlink access congestion, uplink access congestion, and cable degradation.

6. A method according to claim 1 further comprising:
   flagging the subscriber experiencing the diagnosed QoE issue; and
   reporting the flagged subscriber to a service provider.

7. A method according to claim 1 wherein the analyzing of the performance statics comprises:
   determining a plurality of performance statistics for each of the plurality of traffic flows associated with a subscriber;
   determining a service group related to the subscriber;
   determining an average for each of the plurality of performance statistics for the service group;
   determining whether the each of the plurality of performance statistics for each of the plurality of traffic flows associated with a subscriber is above the average of each of the plurality of performance statistics for the service group for a predetermined threshold percentage of time; and
   if the average of any of the plurality of performance statistics for each of the plurality of traffic flows associated with a subscriber is above the predetermined threshold, determining the subscriber has a QoE issue;
   otherwise determining that the subscriber is not suffering from pa QoE issue.

8. A method according to claim 1 wherein the analyzing of the performance statics comprises:
   determining a plurality of performance statistics for each of the plurality of traffic flows associated with a subscriber;
   determining a bonding group related to the subscriber;
   determining an average for each of the plurality of performance statistics for the bonding group;
   determining whether the each of the plurality of performance statistics for each of the plurality of traffic flows associated with a subscriber is above the average of each of the plurality of performance statistics for the bonding group for a predetermined threshold percentage of time; and
   if the average of any of the plurality of performance statistics for each of the plurality of traffic flows associated with a subscriber is above the predetermined threshold, determining the subscriber has a QoE issue;
   otherwise determining that the subscriber is not suffering from a QoE issue.

9. A method according to claim 1 further comprising:
   storing the diagnosed QoE issue associated with a subscriber.

10. A method according to claim 9 further comprising:
    retrieving previously stored QoE issues associated with a subscriber; and
    aggregating the diagnosed QoE issue with the previously stored QoE issues to determine a severity of the QoE issue.

11. A system for remote diagnostic of Quality of Experience (QoE) for a subscriber on a computer network, the system comprising:
    a quality measurement module configured to review a plurality of traffic flows associated with a subscriber to determine performance statistics correlated with each of the traffic flows;
    a subscriber behavior module configured to determine subscriber data related to the subscriber associated with the plurality of traffic flows;
    a memory component configured to store known traffic signatures associated with QoE issues;

an analysis module configured to analyze the subscriber data and performance statistics to determine a traffic signature associated with the plurality of traffic flows; and a diagnostic module configured to
retrieve a plurality of known traffic signatures associate with QoE issues;
determine whether the traffic signature matches any of the plurality of known traffic signatures; and
diagnose the QoE issue based on the match of the traffic signatures.

12. A system according to claim 11 wherein the performance statistics comprise: round trip time, packet loss and throughput.

13. A system according to claim 11 further the diagnostic module is further configured to perform traffic management actions based on the diagnosed QoE issue.

14. A system according to claim 13, wherein the traffic management action comprise: sending the subscriber and upgraded customer premises equipment, upselling the subscriber with WiFi extenders, dynamically rebonding the upstream or downstream channel assignments.

15. A system accord to claim 11 wherein the QoE issue is selected from the group comprising: a poor WiFi access point placement, WiFi downlink congestion, WiFi uplink congestion, downlink access congestion, uplink access congestion, and cable degradation.

16. A system according to claim 11 wherein the diagnostic module is further configured to:
flag the subscriber experiencing the diagnosed QoE issue; and
report the flagged subscriber to a service provider.

17. A system according to claim 11 wherein the analysis module, when analyzing of the performance statics, is configured to:
determine a plurality of performance statistics for each of the plurality of traffic flows associated with a subscriber;
determine a service group related to the subscriber;
determine an average for each of the plurality of performance statistics for the service group;
determine whether the each of the plurality of performance statistics for each of the plurality of traffic flows associated with a subscriber is above the average of each of the plurality of performance statistics for the service group for a predetermined threshold percentage of time; and
if the average of any of the plurality of performance statistics for each of the plurality of traffic flows associated with a subscriber is above the predetermined threshold, determine the subscriber has a QoE issue;
otherwise determine that the subscriber is not suffering from a QoE issue.

18. A system according to claim 11 wherein the analysis module, when analyzing of the performance statics, is configured to:
determine a plurality of performance statistics for each of the plurality of traffic flows associated with a subscriber;
determine a bonding group related to the subscriber;
determine an average for each of the plurality of performance statistics for the bonding group;
determine whether the each of the plurality of performance statistics for each of the plurality of traffic flows associated with a subscriber is above the average of each of the plurality of performance statistics for the bonding group for a predetermined threshold percentage of time; and
if the average of any of the plurality of performance statistics for each of the plurality of traffic flows associated with a subscriber is above the predetermined threshold, determine the subscriber has a QoE issue;
otherwise determine that the subscriber is not suffering from a QoE issue.

19. A system according to claim 11 wherein the memory component is further configured to store the diagnosed QoE issue associated with a subscriber.

20. A system according to claim 19 wherein: the diagnostic module is configured to retrieve previously stored QoE issues associated with a subscriber and aggregate the diagnosed QoE issue with the previously stored QoE issues to determine a severity of the QoE issue.

* * * * *